United States Patent [19]

Peterman et al.

[11] Patent Number: 5,509,304
[45] Date of Patent: Apr. 23, 1996

[54] PHASED ARRAY ACOUSTIC ANTENNA SYSTEM

[75] Inventors: K. Russell Peterman, Boulder, Colo.; Charles Riese, Austin, Tex.; Michael J. Smith, Knoxville, Tenn.

[73] Assignee: Radian Corporation, Austin, Tex.

[21] Appl. No.: 288,939

[22] Filed: Aug. 10, 1994

[51] Int. Cl.⁶ ............................................. G01K 1/00
[52] U.S. Cl. .................. 73/170.13; 73/861.25; 367/90
[58] Field of Search ................. 73/170.13, 861.25; 342/157, 25; 367/90

[56] References Cited

U.S. PATENT DOCUMENTS

| | | | |
|---|---|---|---|
| 3,737,899 | 6/1973 | Georgopoulos | 342/157 |
| 3,747,098 | 7/1973 | Kirkpatrick et al. | 342/157 |
| 3,821,740 | 6/1974 | Ehrlich . | |
| 3,859,622 | 1/1975 | Hutchison et al. . | |
| 3,860,928 | 1/1975 | Ehrlich . | |
| 4,206,639 | 6/1980 | Balser | 73/170.13 |
| 4,207,620 | 6/1980 | Morgera . | |
| 4,270,191 | 5/1981 | Peynaud | 73/170.13 |
| 4,286,462 | 9/1981 | Bourne . | |
| 4,558,594 | 12/1985 | Balser et al. | 73/170.18 |
| 5,122,805 | 6/1992 | Petermann et al. | 342/26 |

FOREIGN PATENT DOCUMENTS 2499252 8/1982 France .

OTHER PUBLICATIONS

Adekola, Sulaiman Adeniyi, A Study Of The Radiation Patterns Of A Shielded Quasi–Tapered Aperture Antenna For Acoustic Echo–Sounding; Cover; Authorization Page; Copyright page; pp. i–iii; Appendix C, pp. 196–216; Appendix D1, pp. 223–226, The Ohio State University, Ph.D. Thesis, 1975 (Xerox University Microfilms, copy furnished 1981).

Primary Examiner—Richard Chilcot
Assistant Examiner—R. Biegel
Attorney, Agent, or Firm—Klauber & Jackson

[57] ABSTRACT

A sound detection and ranging (SODAR) system for taking wind measurements by sending out acoustic pulses and then measuring acoustic energy reflected back to the instrument by the atmosphere. The acoustic pulses are formed using digital beamforming technology which allows the acoustic pulses to be steered independent of frequency due to a time delay design. Also, the present invention SODAR instrument allows wideband capability that is limited only by the dimensions of the antenna array. Furthermore, the present invention SODAR instrument allows the acoustic pulses to be variably steered and allows multiple acoustic beams to be simultaneously received.

21 Claims, 14 Drawing Sheets

FIG. 12

| Channel | Slot 1 | Slot 2 | Slot 3 | Slot 4 |
|---|---|---|---|---|
| 1 | spare | spare | spare | spare |
| 2 | 5-1 | 1-1 | 5-2 | 1-2 |
| 3 | 5-3 | 1-3 | 7-2 | 3-2 |
| 4 | 7-1 | 3-1 | 5-4 | 1-4 |
| 5 | 7-3 | 3-3 | 7-4 | 3-4 |
| 6 | 9-1 | 1-5 | 9-2 | 1-6 |
| 7 | 9-3 | 1-7 | 11-2 | 3-6 |
| 8 | 11-1 | 3-5 | 9-4 | 1-8 |
| 9 | 11-3 | 3-7 | 11-4 | 3-8 |
| 10 | 5-5 | 1-9 | 5-6 | 1-10 |
| 11 | 5-7 | 1-11 | 7-6 | 3-10 |
| 12 | 7-5 | 3-9 | 5-8 | 1-12 |
| 13 | 7-7 | 3-11 | 7-8 | 3-12 |
| 14 | 9-9 | 5-9 | 9-6 | 5-10 |
| 15 | 9-7 | 5-11 | 11-6 | 7-10 |
| 16 | 11-5 | 7-9 | 9-8 | 5-12 |

| Channel | Slot 5 | Slot 6 | Slot 7 | Slot 8 |
|---|---|---|---|---|
| 1 | spare | spare | spare | spare |
| 2 | 6-2 | 2-2 | 6-1 | 2-1 |
| 3 | 6-4 | 2-4 | 8-1 | 4-1 |
| 4 | 8-2 | 4-2 | 6-3 | 2-3 |
| 5 | 8-4 | 4-4 | 8-3 | 4-3 |
| 6 | 10-2 | 2-6 | 10-1 | 2-5 |
| 7 | 10-4 | 2-8 | 12-1 | 4-5 |
| 8 | 12-2 | 4-6 | 10-3 | 2-7 |
| 9 | 12-4 | 4-8 | 12-3 | 4-7 |
| 10 | 6-6 | 2-10 | 6-5 | 2-9 |
| 11 | 6-8 | 2-12 | 8-5 | 4-9 |
| 12 | 8-6 | 4-10 | 6-7 | 2-11 |
| 13 | 8-8 | 4-12 | 8-7 | 4-11 |
| 14 | 10-6 | 6-10 | 10-5 | 6-9 |
| 15 | 10-8 | 6-12 | 12-5 | 8-9 |
| 16 | 12-6 | 8-10 | 10-7 | 6-11 |

PHASED ARRAY ACOUSTIC ANTENNA SYSTEM

BACKGROUND OF THE INVENTION

1. Field of the Invention

The present invention relates to atmospheric wind measuring devices and, more particularly, to an atmospheric remote sensing instrument that takes wind measurements by sending out acoustic pulses and then measuring acoustic energy reflected back to the instrument by the atmosphere.

2. Description of the Prior Art

Measuring wind changes with altitude is necessary in order to provide the input data that meteorological models require so as to produce the most accurate results. Weather forecasters have traditionally used weather balloons, and more recently weather satellites, to measure wind changes at altitudes of 50 kilometers or more. In the lower atmosphere, however, balloons and satellites have difficulty providing the kind of high resolution, continuous measurements that are needed in meteorological modeling for air quality decisions such as permit approval or photochemical control strategy development. A practical answer to this measurement need, now in common use, is to "listen" to the winds in the first few hundreds of meters above the ground using an instrument called a SODAR.

The term SODAR is an acronym for "Sound Detection And Ranging". It refers to an atmospheric remote sensing instrument that takes measurements in vertical profiles directly above the instrument's outdoor antenna system. These vertical profiles are commonly called soundings, and a SODAR is, therefore, commonly called an acoustic sounder. A SODAR is a remote sensing instrument because it measures the atmosphere above its antenna system remotely, which means that the instrument does not directly touch the air being measured. It takes the measurements by sending acoustic pulses upward and then measuring the acoustic energy reflected back to the instrument by the atmosphere. Unlike a meteorological instrument that takes point measurements wherever it is positioned, a SODAR remotely measures a volume of air above its antenna system and averages over the volume in height intervals to provide a single reading for each height interval.

Although several types of SODAR instruments exist, the present invention is concerned with a so called monostatic SODAR. A monostatic SODAR, such as that disclosed in U.S. Pat. No. 4,558,594, uses a single antenna system to both transmit acoustic signals upward into the atmosphere and to measure the reflection of those signals back from small scale turbulence (caused by small scale thermal gradients) in the air. While the characteristics of the antenna system can vary significantly by manufacturer, the basic technique requires that measurements be made sequentially and repetitively along three beam paths, one of which is vertical and the other two slightly tilted off vertical and orthogonal to each other (i.e., the two tilted beams might point southeast and northeast, west and north, northwest and southwest, etc.). Standard measurements are made by transmitting a pulse along the first beam path, then waiting a few seconds for all reflected energy from the atmosphere to be received back at the antenna, then transmitting on the second beam path and waiting for all reflected energy, then transmitting on the third beam path and waiting for all reflected energy, then continuing to repeat this "ping" cycle continuously to accumulate measurements for averaging during automated data processing. Alternative SODAR configurations use more than three beam paths to produce more reliable and accurate wind measurements. The data from the extra beam directions is used for cross-checking, to detect and compensate for erroneous radial wind samples. For example, a SODAR configuration using five beams could use one vertical beam path and four beams tilted slightly of vertical and orthogonal to each other (e.g. the tilted beams might point east, north, west, and south). Similar to the manner described for the three beam configuration, pulses would be transmitted along each of the five beams in sequence and the echo signals would be analyzed so as to determine the radial winds along each of the beam axes. Three of the five measured radial winds (from the vertical, north, and south beams) would contain information about the north/south component of the wind, which can be computed from any two of these three values. The extra measurement is available for quality assurance computations, to determine whether the set of three radial winds is consistent with a set of north/south and vertical wind component values. In a similar manner, another subset of measured radial winds (from the vertical, east, and west beams) would contain redundant data for computing a verified east/west wind component. Signal processing algorithms can be used to reliably determine which radial wind samples are erroneous.

The approach just described may be applied to any configuration with four or more beams, as long as three independent beam directions are present. It is not necessary for subsets of three beam axes to be coplanar, as in the five beam example above. If that is the case, however, the calculations are simpler.

SODARs are commonly called "Doppler SODARs" because they use the frequency difference (called "Doppler shift") between the transmitted and the reflected acoustic energy to determine the movement of air that reflected the acoustic energy. The frequency shift from each beam path is converted into a radial wind along that path, and the radial winds from the respective beam paths are then combined (using mathematical computations) to produce horizontal wind direction and speed at designated height intervals in the vertical profile above the antenna system. The resultant horizontal wind direction and speed value for each vertical interval represents an average for the volume measured and over the time span designated by the operator. The size of the volume measured depends on the characteristics of the beams used and on the depth of the height intervals set by the operator. The SODAR assigns heights to the data according to length of time it took for the increments of the reflected acoustic energy to be received back at the antenna.

Using the wind data, some SODARs provide derivative information such as wind components (u,v,w), standard deviations ($\sigma w, \sigma \theta, \sigma \phi$), and stability class estimates (Showalter Classes A–F). In addition to analyzing for Doppler shift to estimate winds, SODARs also commonly record the strength of the reflected acoustic energy, called "backscatter." When displayed in time-height cross section, "backscatter" data recorded by the SODAR show atmospheric thermal structure patterns that can be interpreted by either automated software algorithms or a meteorologist to provide estimates of mixing heights, a feature particularly important to air pollution applications.

The primary factors influencing SODAR performance are atmospheric conditions, siting conditions, and the configuration of the SODAR system being used. Atmospheric and siting conditions dictate how much reflected atmospheric "signal" a SODAR will be able to correctly recognize. Since acoustic energy attenuates rapidly with distance, the height measurement capability of a SODAR will improve and degrade over time as the capacity of the atmosphere to strongly reflect acoustic signals changes. Also, since the SODAR will "hear" noises from both the atmosphere (e.g., rain) and other sources (e.g., automobile traffic) within its transmit frequency range, the height capability of a SODAR will vary according to the strength of the background noise of the atmosphere and siting environment in which it is operating. The adverse impact of background noise can be reduced somewhat by use of an acoustic cuff around the antenna array. Also important in the siting environment is the presence or absence of nearby structures that may reflect acoustic energy back into the antenna system and interfere with its operation. An operator can usually control the height sensing capability of a SODAR to a certain extent according to the configuration of the particular SODAR system being used. The most important factor in this area is the "pulse length," which helps control how much acoustic energy is transmitted. The longer the pulse length set, the more energy transmitted. Longer pulse lengths help reach to greater measurement heights, but tend to also raise the minimum altitude that can be accurately measured and the minimum vertical interval that can be measured. An operator can usually also influence sensing height capability by the length of the time averaging period used for data measurements. For example, setting a particular SODAR system to record 15 minute average winds will normally allow greater sensing altitude than 5 minute average winds because it increases the probability that usable reflected energy samples will be recorded at the upper sensing altitudes during the time averaging period (simply because the averaging period is longer). Also longer averaging times can benefit signal processing by tending to improve both data quality and altitude coverage. An operator can usually also set the receive gain according to the sensing height desired. The maximum gain setting would normally be used when the emphasis is on sensing as high as possible. Conversely, reducing the gain can be helpful when the emphasis is on the lower sensing altitudes, as a gain setting too high can contribute to receiver saturation causing data loss in the lower gates. Regarding height sensing capability in general, the condition of the atmosphere is the single greatest factor in determining to what height data can be collected. Limiting atmospheric conditions include wind speeds and the presence or absence of small-scale thermal gradients. Wind speeds are important in that strong winds tend to blow the transmitted acoustic beams laterally and the reflected acoustic energy from greater heights may therefore also be laterally displayed and not received back at the antenna. Small-scale thermal gradients are important, because a monostatic Doppler SODAR relies on the presence of these gradients to reflect the acoustic energy back to the antenna. This means that when the atmosphere is well mixed, sensing conditions are relatively poor. Well mixed conditions that occur throughout the sensing range of a SODAR result in only the lower gates being measurable, while well mixed conditions that occur in layers within the sensing range of a SODAR result in those layers not being measurable, whereas the lessor mixed layers above and below are measurable.

SUMMARY OF THE INVENTION

The present invention contemplates a monostatic SODAR instrument that takes wind measurements by sending out acoustic pulses and then measuring acoustic energy reflected back to the instrument by the atmosphere. The acoustic pulses are formed using digital beamforming technology which allows the acoustic pulses to be steered independent of frequency due to a time delay design. Also, the present invention SODAR instrument allows wideband capability that is limited only by the dimensions of the antenna array. Furthermore, the present invention SODAR instrument allows the acoustic pulses to be variably steered and allows multiple acoustic beams to be simultaneously received.

One embodiment of the present invention SODAR instrument provides a single phased-array antenna so as to transmit and receive pulse beams, in sequence, along three beam paths using a flat planar array of 120 transmit/receive acoustic transducers. A factor-of-three size reduction over most prior art antenna systems, the present invention antenna system has increased portability and reduced the shipping costs. Also, the digital beamforming technology provides several advantages over prior art analog techniques including having the capability to change beam angles as necessary for best results, the use of automated self-test and diagnostics for quality control, and the use of solid state components so as to increase reliability.

Accordingly, the primary objective of the present invention is to provide a monostatic SODAR instrument that takes wind measurements by sending out acoustic pulses and then measuring acoustic energy reflected back to the instrument by the atmosphere, wherein the acoustic pulses are formed using digital beamforming technology which allows the acoustic pulses to be steered independent of frequency due to a time delay design.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now be made to the appended drawings. The drawings should not be construed as limiting the present invention, but are intended to be exemplary only.

FIG. 12 is a table listing the connection arrangement between each transducer element shown in FIG. 11 and a corresponding channel on a corresponding amplifier board.

PREFERRED EMBODIMENT OF THE PRESENT INVENTION

Figure 1:
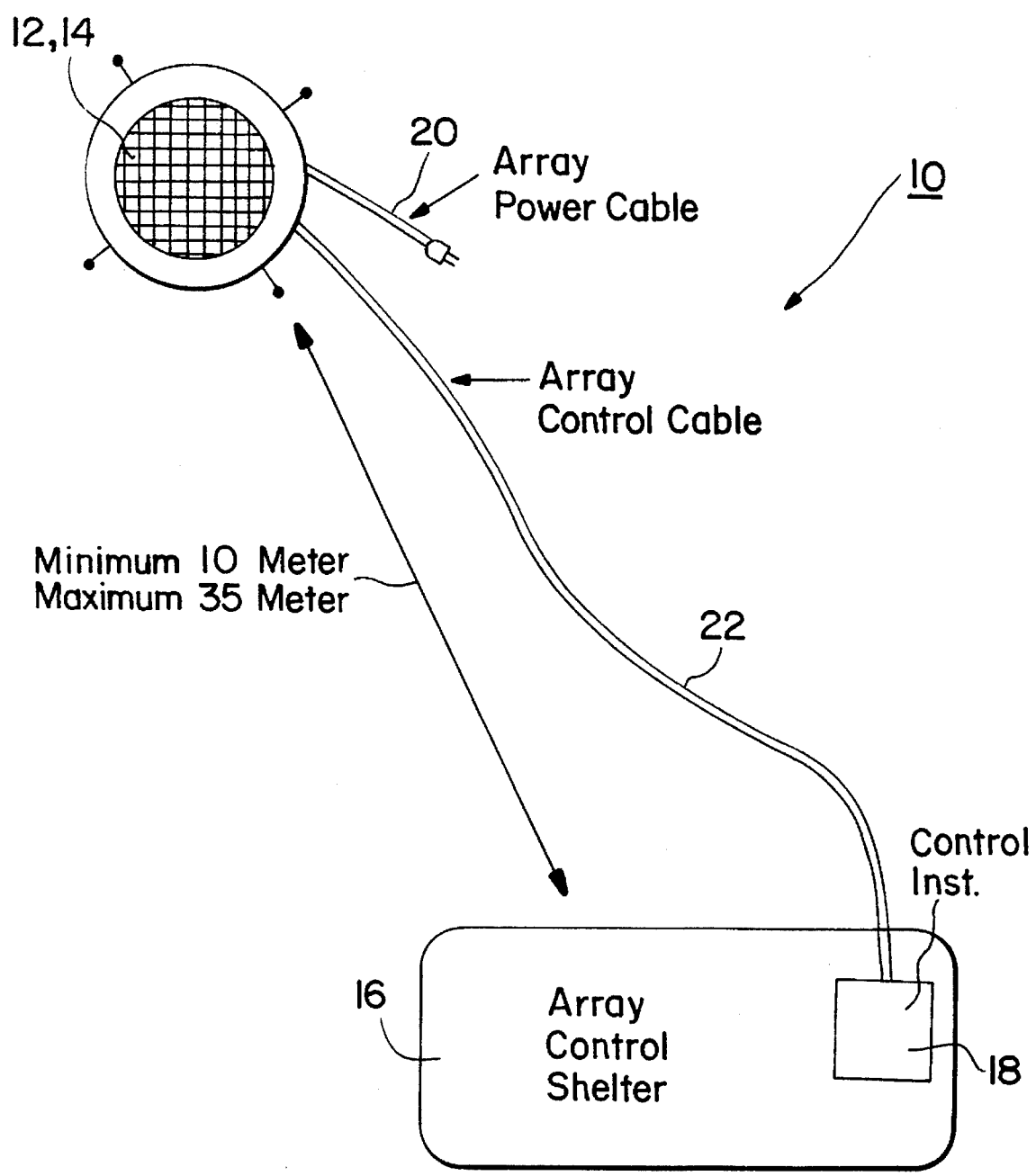
FIG. 1 is a schematic representation of one embodiment of a monostatic SODAR system according to the present invention.

Referring to FIG. 1, there is shown a schematic representation of one embodiment of a monostatic SODAR system 10 according to the present invention. The SODAR system 10 comprises an antenna array 12 having array electronics 14 and an array control shelter 16 for housing array control instruments 18. The antenna array 12 and the array electronics 14 are supplied power through a power cable 20, which is typically connected to a power source located at the array control shelter 16. It should be noted, however, that power may be supplied to the antenna array 12 and the array electronics 14 from any suitable power source. The antenna array 12 and the array electronics 14 are electronically controlled by control signals that are generated by the array control instruments 18 and transmitted over an array control cable 22. The array control cable 22 connects the antenna array 12 and the array electronics 14 to the array control instruments 18 housed in the array control shelter 16. The antenna array 12 and the array electronics 14 are preferably located between 10–35 meters from the array control shelter 16 so as to insure that the control signals are free from noise, while also insuring that any sounds generated from, or near, the array control shelter 16 do not interfere with the operation of the SODAR system 10.

Figure 2:
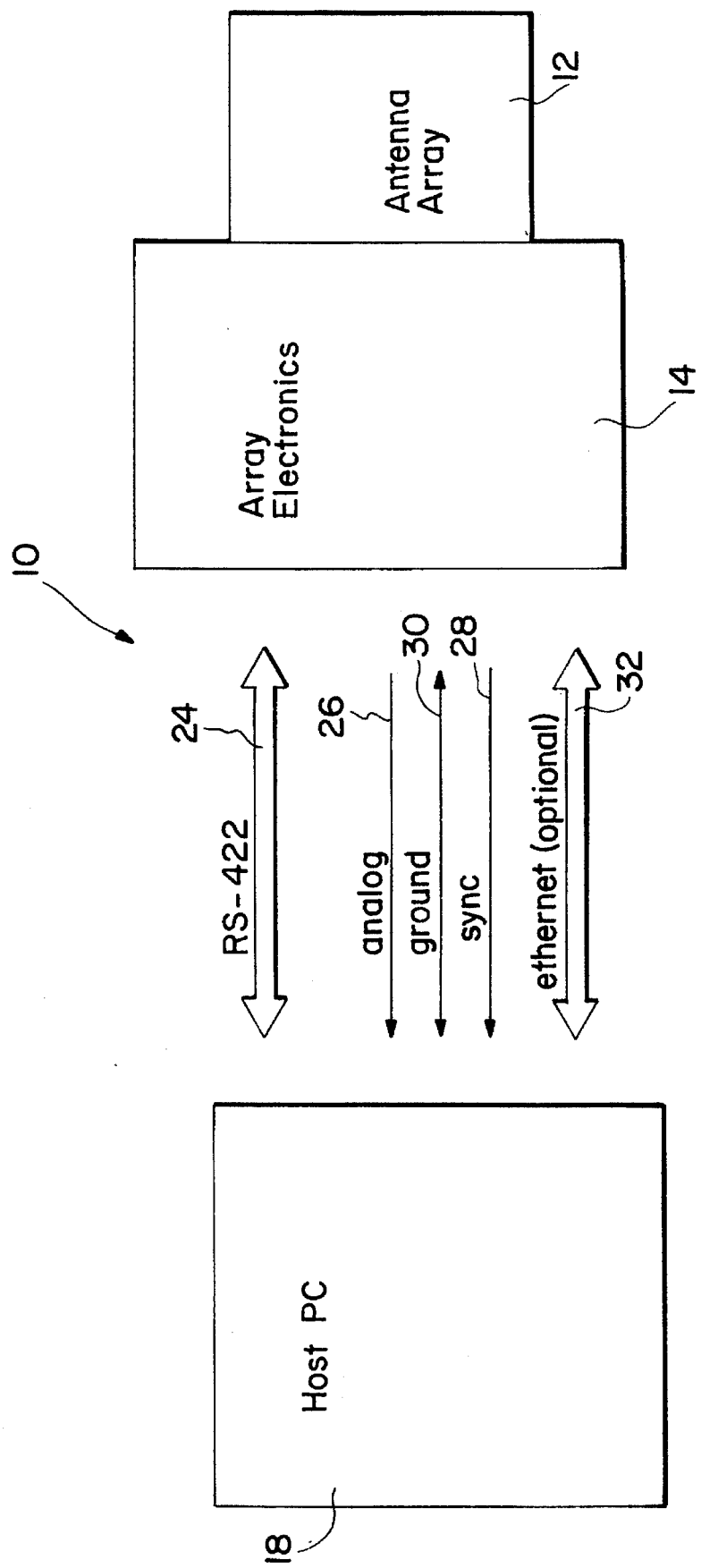
FIG. 2 is a more detailed schematic representation of the monostatic SODAR system shown in FIG. 1.

Referring to FIG. 2, there is shown a more detailed schematic representation of the monostatic SODAR system 10 shown in FIG. 1. The array control instruments 18 typically comprise a host personal computer (PC), including accessories, which communicate with the antenna array 12 and the array electronics 14 via an RS-422 communication link 24. The RS-422 communication link 24 is made through the array control cable 22, along with an analog data signal line 26, a data synchronization signal line 28, and a ground connection 30. The analog data signal line 26, the data synchronization signal line 28, and the ground connection 30 allow the array electronics 14 to send real time wind measurement data to the array control instruments 18. It should be noted that the RS-422 communication link 24, the analog data signal line 26, the data synchronization signal line 28, and the ground connection 30 may be replaced with an optional ethernet communication link 32. The use of such an ethernet communication link 32 would permit the antenna array 12 and the array electronics 14 to be located much further than 35 meters from the array control shelter 16.

Figure 3:
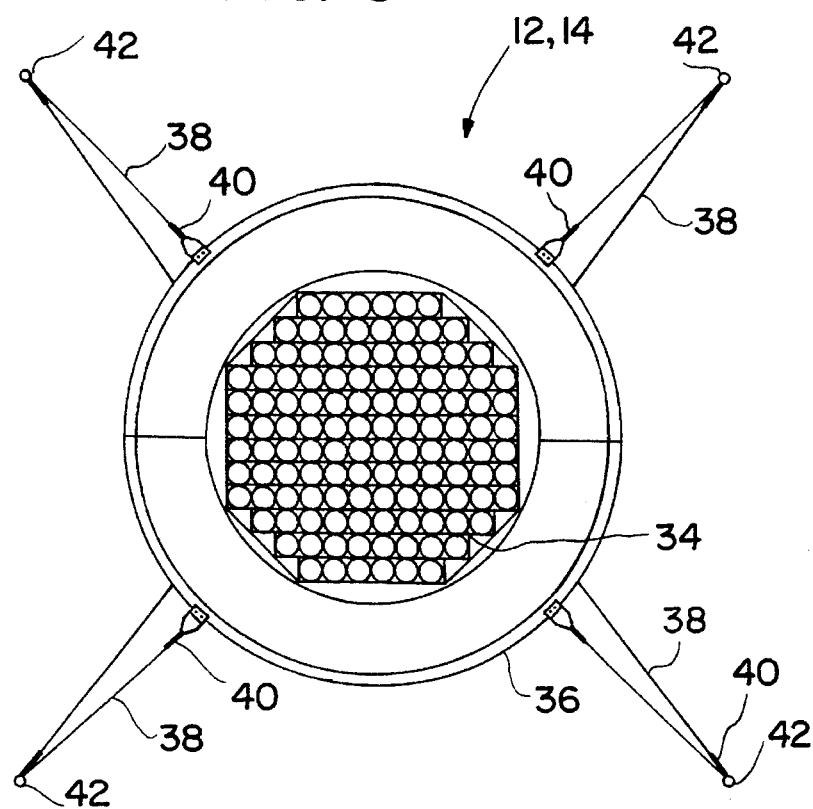
FIG. 3 is a top view of the antenna array and the array electronics shown in FIGS. 1 and 2.
Figure 4:
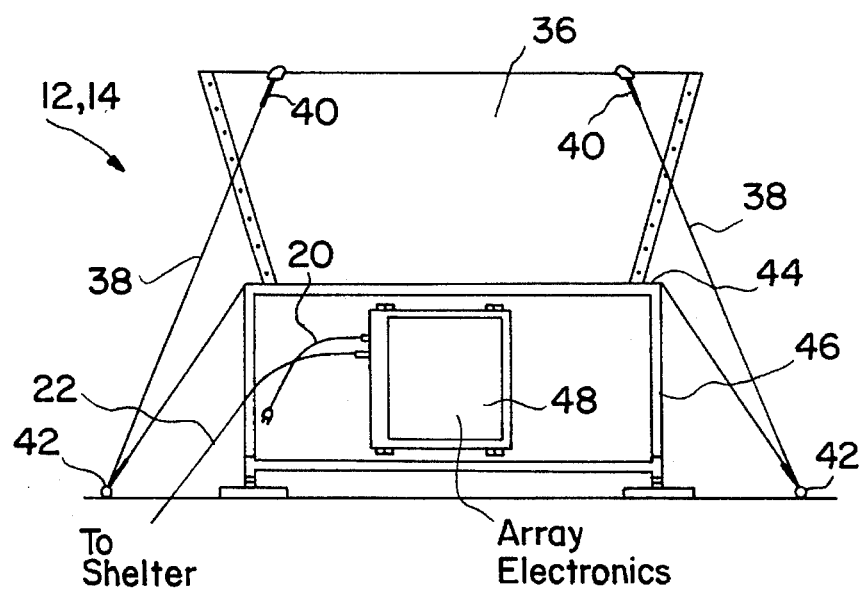
FIG. 4 is a side view of the antenna array and the array electronics shown in FIGS. 1 and 2.

Referring to FIGS. 3 and 4, there are shown a top view and a side view, respectively, of the antenna array 12 and the array electronics 14. The antenna array 12 comprises an array of transducer elements 34 surrounded by an antenna cuff 36 which itself is secured in place by guy wires 38, turnbuckles 40, and earth anchors 42. The array of transducer elements 34 is situated on an antenna base 44 which itself is supported by a support stand 46. The array electronics 14 comprises a plurality of circuit boards and associated circuitry which are housed in a watertight enclosure 48 which itself is supported by the support stand 46.

Figure 5:
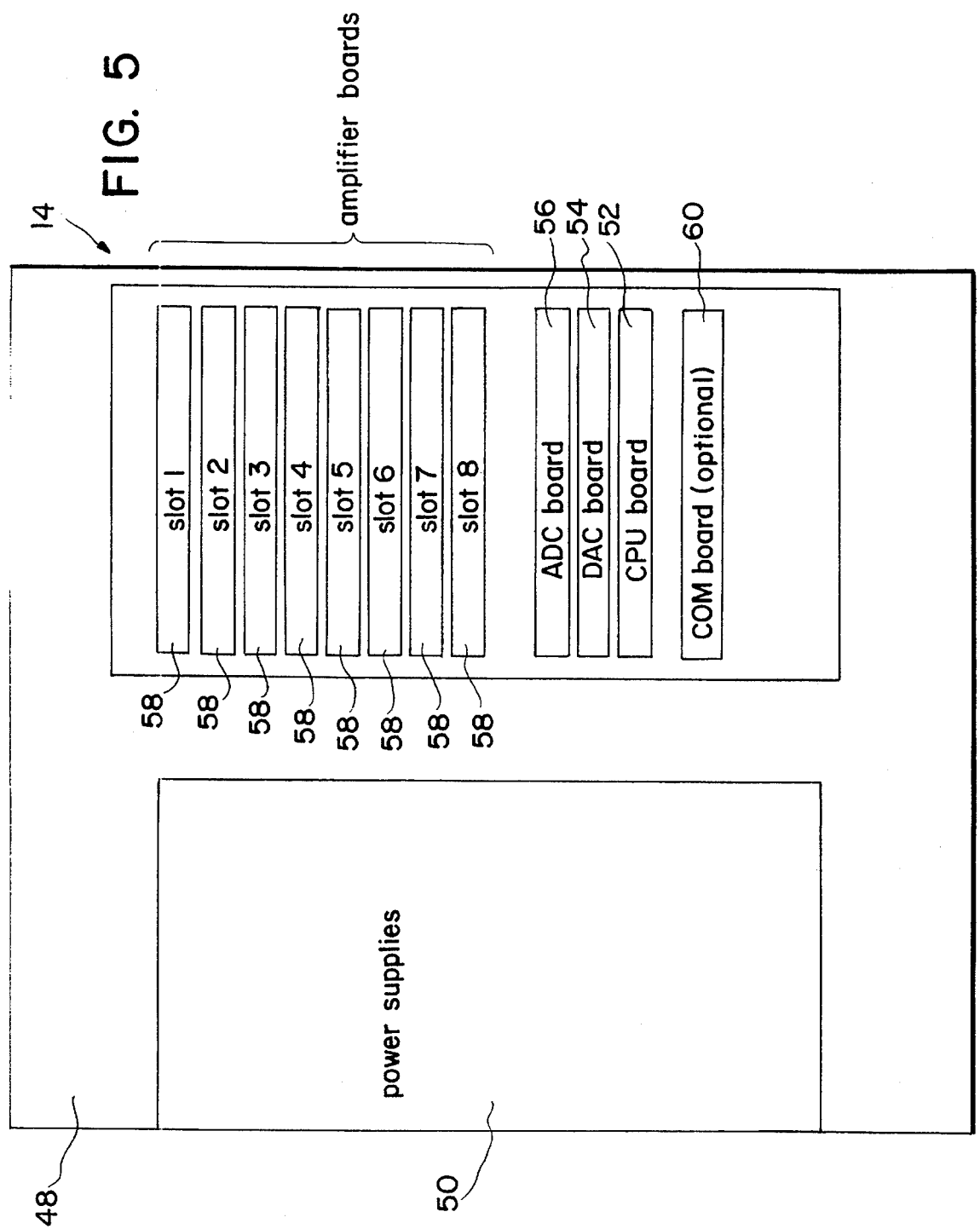
FIG. 5 is an internal view of a watertight enclosure revealing a plurality of circuit boards which comprise the array electronics shown in FIGS. 1 and 2.

Referring to FIG. 5, there is shown an internal view of the watertight enclosure 48 revealing the plurality of circuit boards which comprise the array electronics 14. The array electronics 14 control the array of transducer elements 34 by generating a plurality of analog transmit signals and controlling each of these plurality of analog transmit signals so as to control the direction of a beam of transmitted acoustic energy from the array of transducer elements 34. The array electronics 14 also process a plurality of analog receive signals, which are provided by the array of transducer elements 34, so as to provide an indication of wind characteristics based on the characteristics of a reflected portion of the directed beam of transmitted acoustic energy as compared to the characteristics of the directed beam of transmitted acoustic energy.

The array electronics 14 comprise a plurality of power supplies 50, a CPU board 52, a DAC board 54, a ADC board 56, and eight amplifier boards 58. The plurality of power supplies 50 convert typical line voltages (i.e. 110 VAC or 220 VAC) into useable electronic voltage levels (i.e. +40 VDC, −40 VDC, +5 VDC, and −5 VDC) for the various circuit boards 52,54,56,58.

In normal operation, the CPU board 52 receives commands from the array control instruments 18, processes the commands, and controls the DAC board 54, the ADC board 56, and the amplifier boards 58 accordingly. The DAC board 54 receives digital commands from the CPU board 52 and generates the plurality of analog transmit signals for the amplifier boards 58. The amplifier boards 58 amplify the plurality of analog transmit signals and send them to the array of transducer elements 34, while the amplifier boards 58 also amplify the plurality of analog receive signals and send them to the ADC board 56. The ADC board 56 receives digital commands from the CPU board 52 and digitizes the plurality of analog receive signals so that they may be processed by the CPU board 52. The CPU board 52 then transmits back to the array control instruments 18 data indicating wind characteristics based on the characteristics of the reflected portion of the directed beam of transmitted acoustic energy as compared to the characteristics of the directed beam of transmitted acoustic energy. The manner of receiving commands from the array control instruments 18 and the manner of transmitting data back to the array control instruments 18 is dependent upon the configuration of the array electronics 14.

As previously indicated, the array electronics 14 may communicate with the array control instruments 18 via either the RS-422 communication link 24, and through the analog data signal line 26, the data synchronization signal line 28, and the ground connection 30, or via an optional ethernet communication link 32. When an optional ethernet communication link 32 is utilized, the array electronics 14 further comprises an optional COM board 60. The optional COM board 60 acts as a communication interface between the CPU board 52 and the array control instruments 18.

Figure 6A:
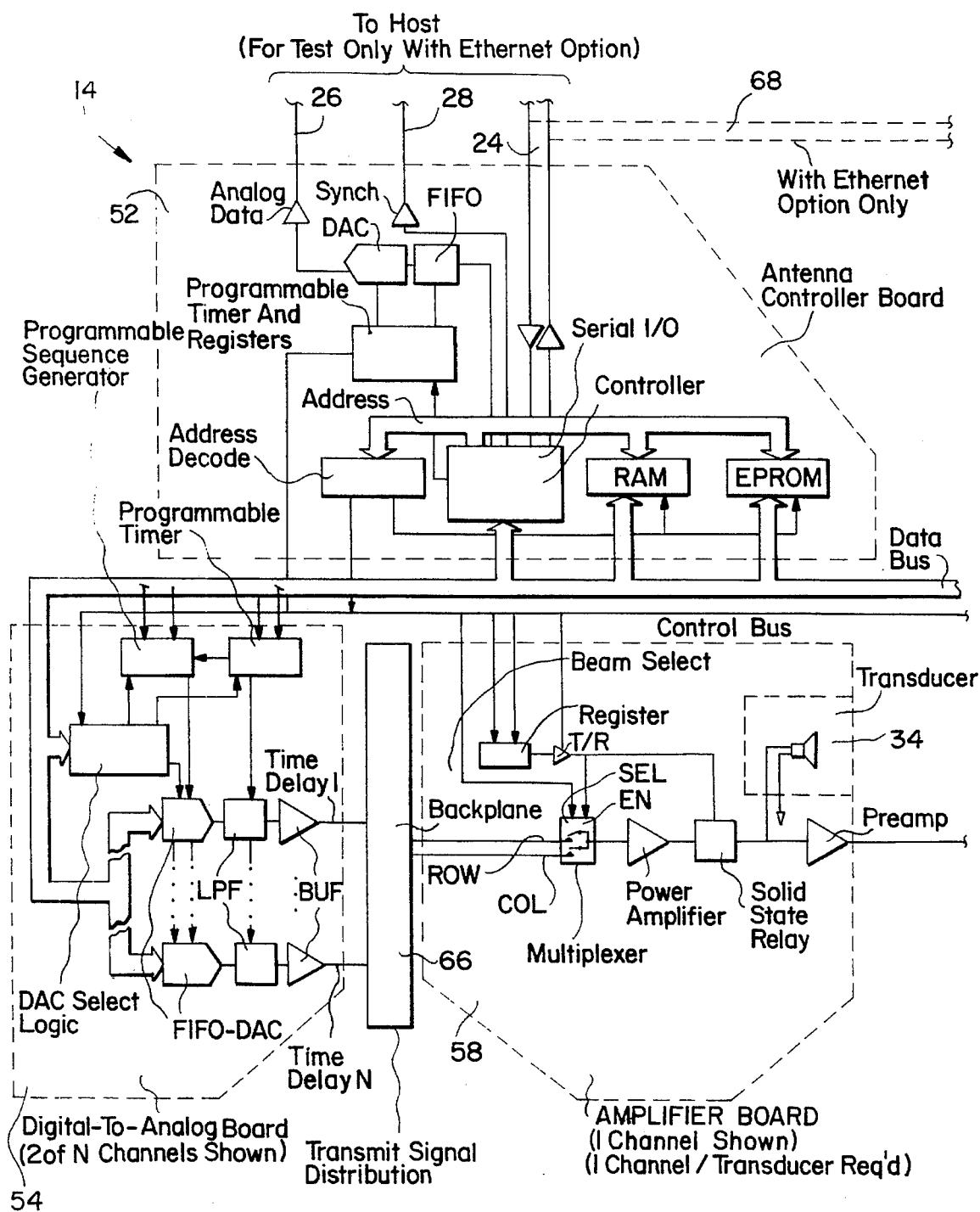
FIGS. 6A and 6B are a schematic representation of the array electronics shown in FIGS. 1 and 2.
Figure 6B:
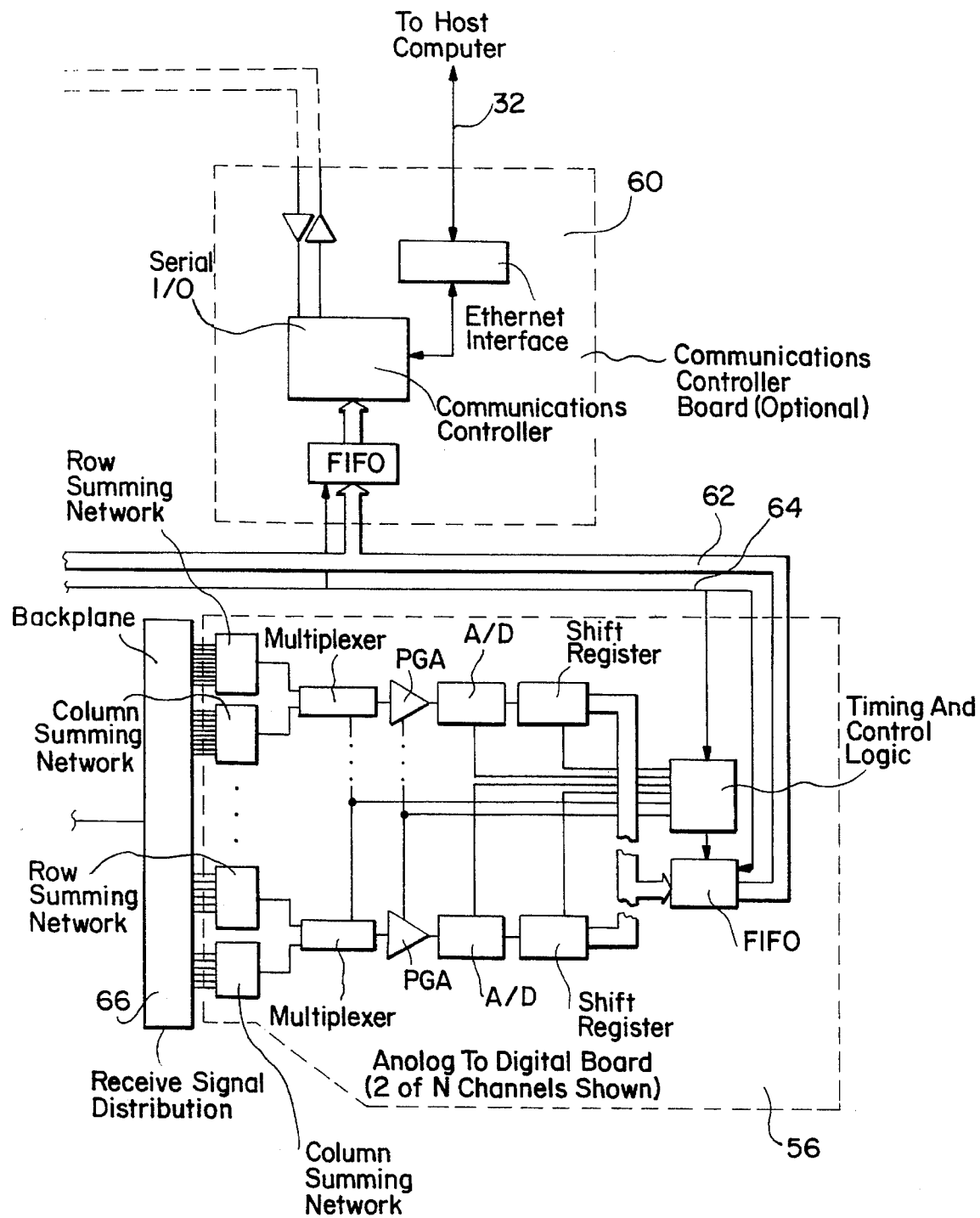

Referring to FIGS. 6A and 6B, there is shown a schematic representation of the array electronics 14. The various circuit boards 52,54,56,58,60 are shown with dotted line borders so as to provide a better understanding of how each circuit board 52,54,56,58,60 operates in conjunction each other. A detailed description of each circuit board 52,54,56,58,60 is given when FIGS. 7,8,9,10, and 13, respectively, are described. It should first be noted, however, that each of the circuit boards 52,54,56,58,60 is connected to a main data bus 62 and/or a main control bus 64. Furthermore, the plurality of analog transmit signals generated by the DAC board 54 are connected to the amplifier boards 58 via a backplane motherboard 66, while the plurality of analog receive signals provided by the array of transducer elements 34 and received by the amplifier boards 58 are connected to the ADC board 56 also via the backplane motherboard 66. It should also be noted that when the optional COM board 60 is utilized, an optional RS-422 communication link 68 is created between the optional COM board 60 and the CPU board 52. This optional RS-422 communication link 68 allows the optional COM board 60 to receive commands from the array control instruments 18 via the optional ethernet communication link 32 whereby these commands are then transmitted from the optional COM board 60 to the CPU board 52 via the optional RS-422 communication link 68. The reason for providing this optional RS-422 communication link 68 is to reduce any impact on the operating software of the CPU board 52.

Figure 7:
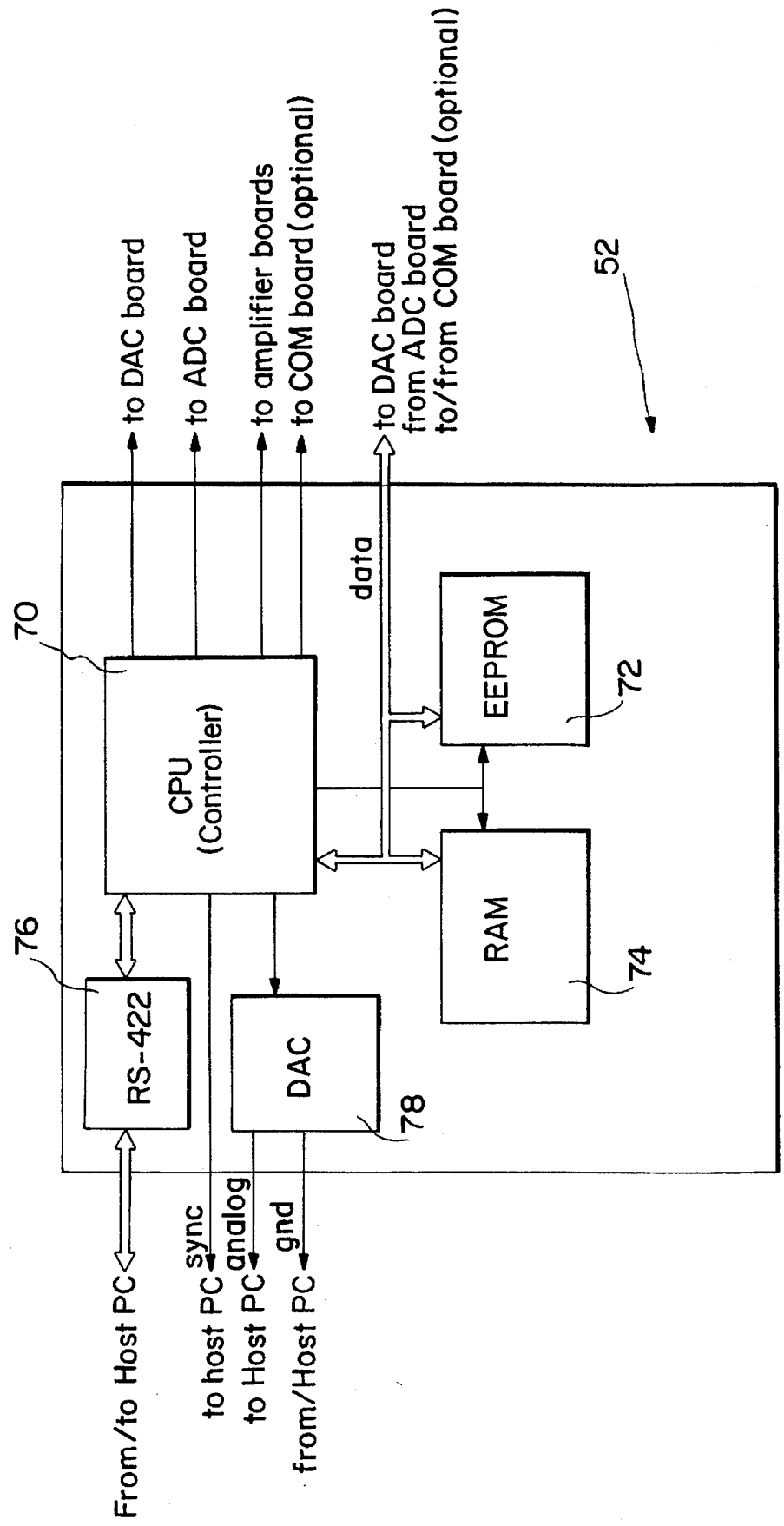
FIG. 7 is a schematic representation of the CPU board shown in FIGS. 5 and 6.

Referring to FIG. 7, there is shown a schematic representation of the CPU board 52. The CPU board 52 comprises a CPU controller 70 for performing data processing and issuing control signals, an EEPROM 72 which contains program memory, a RAM 74 for temporary data storage, an RS-422 communication link controller 76, and a digital to analog converter (DAC) 78 for converting the digitized and processed analog receive signals into analog wind measurement data and sending real time analog wind measurement data to the array control instruments 18.

Figure 8:
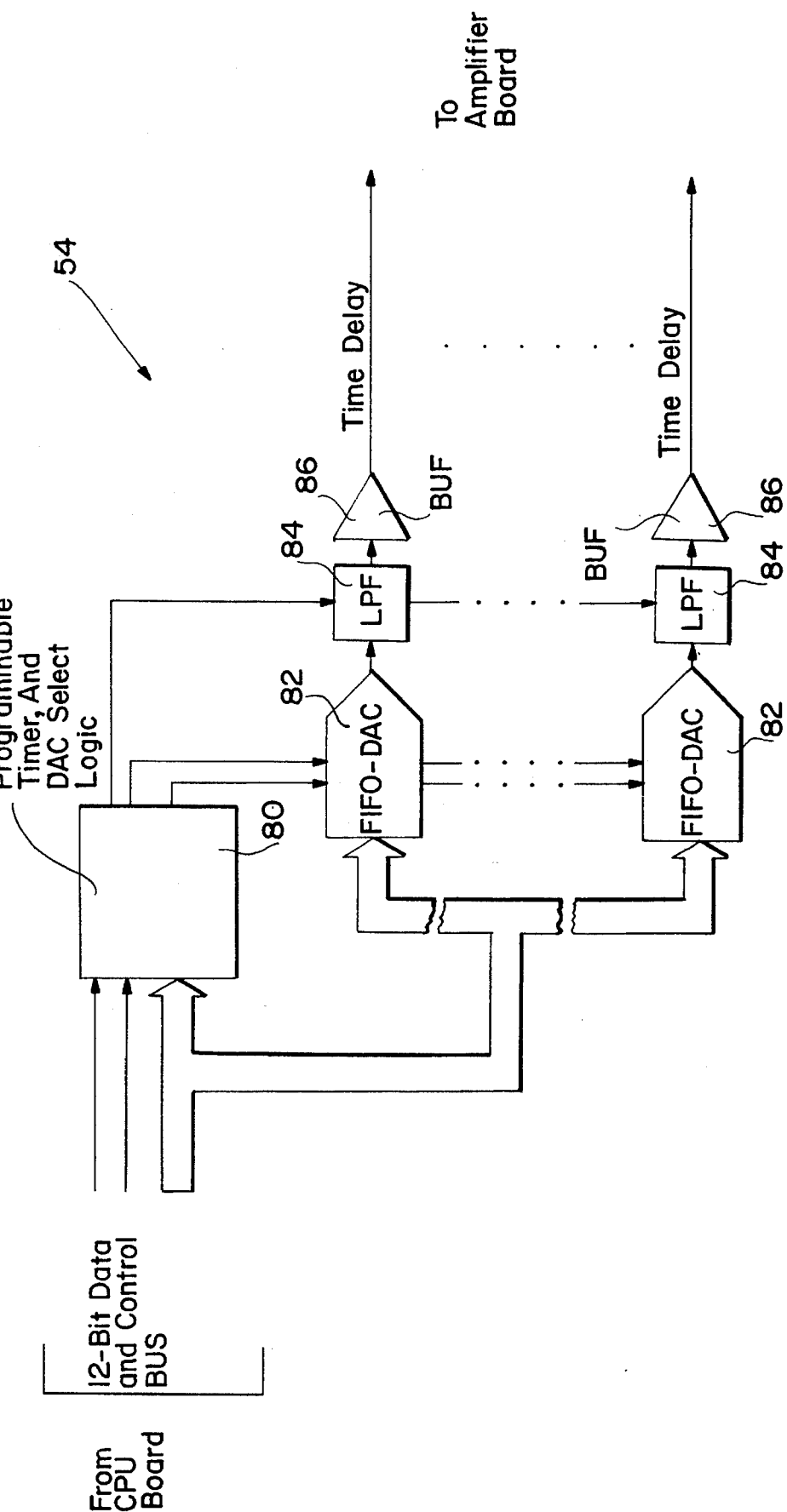
FIG. 8 is a schematic representation of the DAC board shown in FIGS. 5 and 6.

Referring to FIG. 8, there is shown a schematic representation of the DAC board 54. The DAC board 54 comprises a programmable timer, a programmable sequence generator, and DAC select logic 80 all of which are under the control of the CPU board 52. The DAC board 54 also comprises a plurality of first-in/first-out digital-to-analog converters (FIFO-DAC) 82, a corresponding plurality of digitally controlled low pass filters 84, and a corresponding plurality of buffer circuits 86. The DAC board 54 receives digital commands from the CPU board 52 and generates the plurality of analog transmit signals for the amplifier boards 58. Each of the plurality of analog transmit signals are shifted in time by a predetermined amount according to the commands received by the CPU board 52 from the array control instruments 18. The reason for time shifting the plurality of analog transmit signals is, as will be explained in more detail shortly, to control the direction of the beam of transmitted acoustic energy from the array of transducer elements 34. Since the amount by which each analog transmit signal is time shifted is variable, each low pass filter 84 is digitally controlled so as to track the frequency of each corresponding FIFO-DAC 82. It should be noted that in the embodiment of the monostatic SODAR system 10 described herein there are twelve FIFO-DACs 82, twelve corresponding digitally controlled low pass filters 84, twelve corresponding buffer circuits 86, and hence twelve time shifted analog transmit signals. It should also be noted that a typical transmit frequency is 2125 Hz with the twelve analog transmit signals typically being time shifted by approximately 82.6 μsec.

Figure 9:
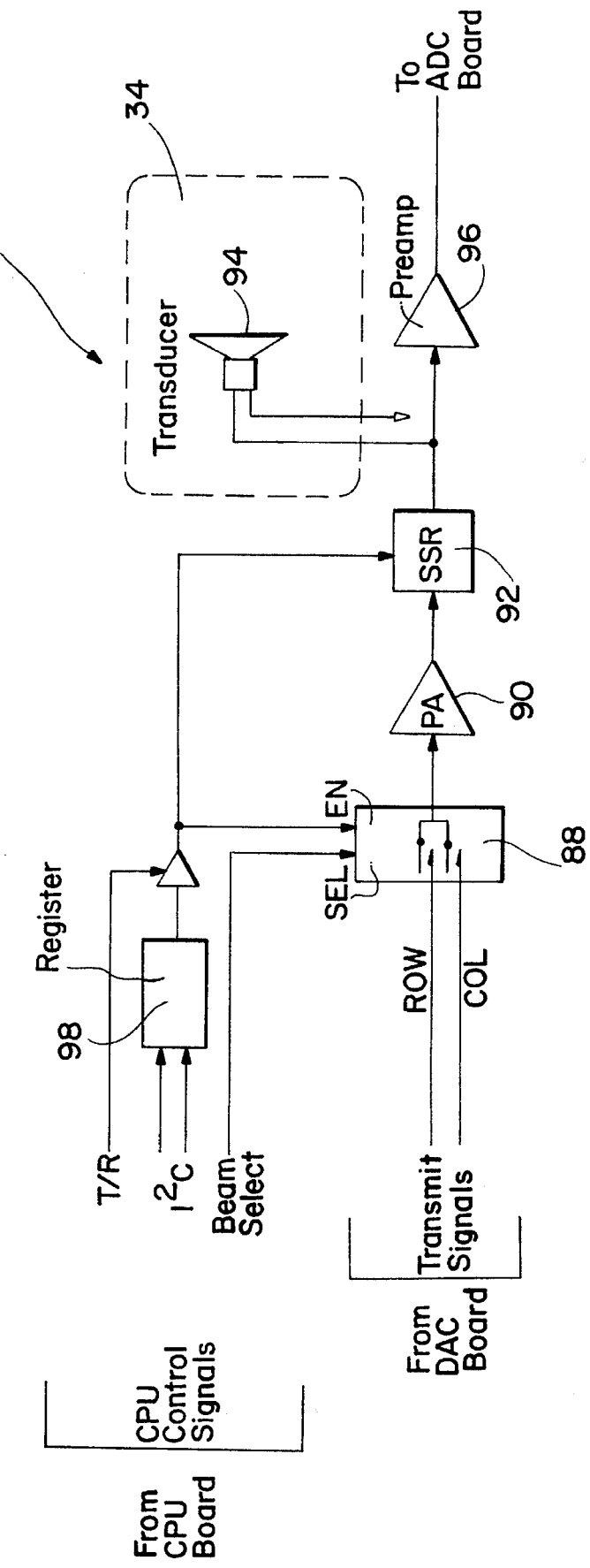
FIG. 9 is a schematic representation of one of a plurality of identical circuits on one of the eight amplifier boards shown in FIGS. 5 and 6.

Referring to FIG. 9, there is shown a schematic representation of one of a plurality of identical circuits on one of the eight amplifier boards 58. Each of the identical circuits on the amplifier boards 58 comprise a multiplexer 88 for selecting either a dedicated row or a dedicated column analog transmit signal, a power amplifier 90 for amplifying the selected analog transmit signal, a solid state relay 92 for connecting or disconnecting the selected analog transmit signal to or from a corresponding transducer element 94 in the array of transducer elements 34, and a preamplifier 96 for amplifying an analog receive signal provided by the corresponding transducer element 94 in the array of transducer elements 34. In order to control the selection of analog transmit signals and the connection of the selected analog transmit signal to the corresponding transducer element 94 in the array of transducer elements 34, each amplifier board 58 comprises a control register 98 which is under the control of the CPU board 52. Each bit in the control register 98 corresponds to one of the plurality of identical circuits on the amplifier boards 58, thereby controlling the selection of the analog transmit signal and the connection of the selected analog transmit signal to the corresponding transducer element 94 in the array of transducer elements 34. It should be noted that in the embodiment of the monostatic SODAR system 10 described herein there are sixteen identical circuits, called channels, on each amplifier board 58. Thus, in the embodiment of the monostatic SODAR system 10 described herein, it is possible to drive 128 individual transducer elements.

Figure 10:
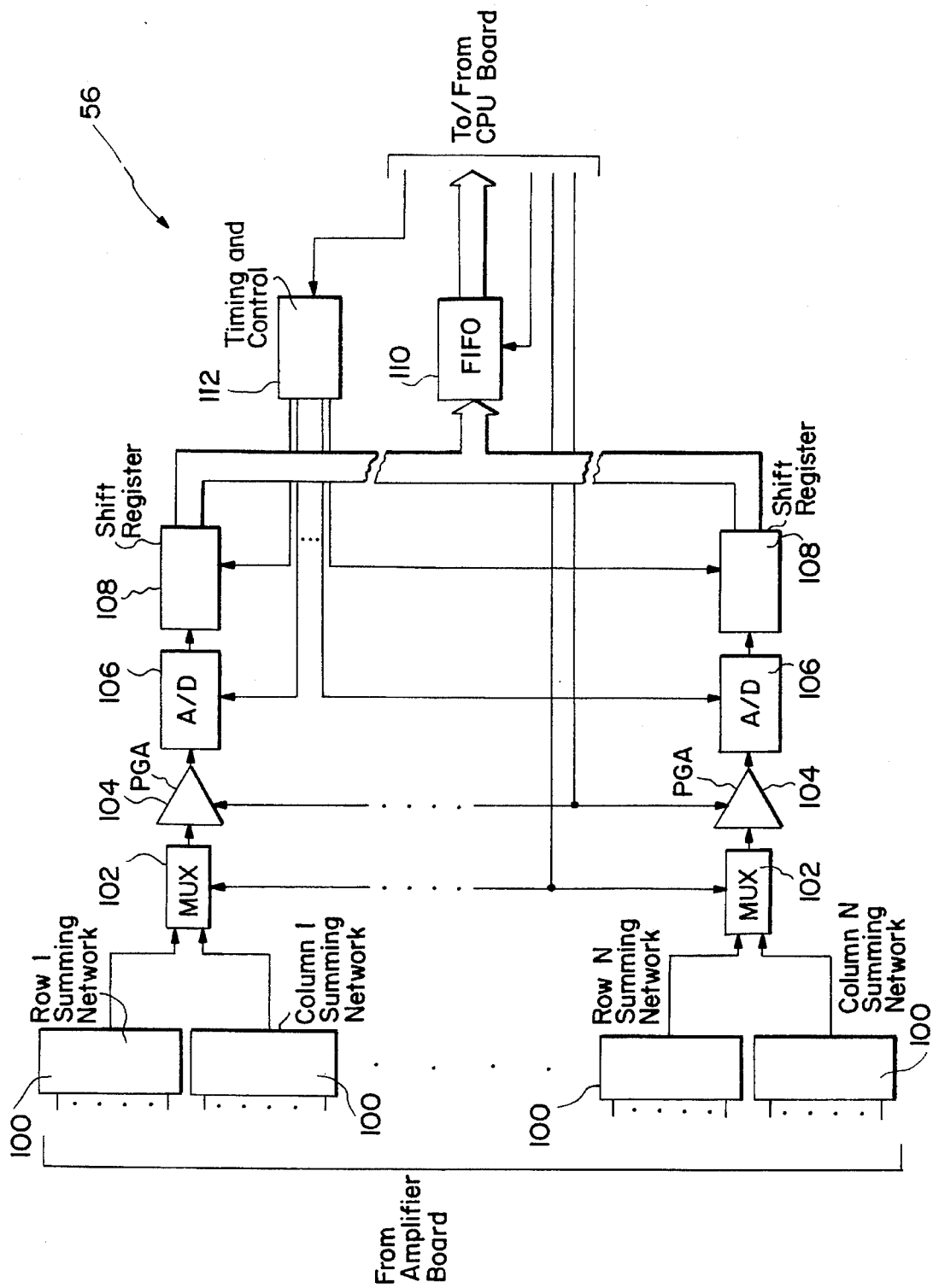
FIG. 10 is a schematic representation of the ADC board shown in FIGS. 5 and 6.

Referring to FIG. 10, there is shown a schematic representation of the ADC board 56. The ADC board 56 comprises a plurality of row and column summing networks 100 for summing the plurality of analog receive signals, a plurality of multiplexers 102 for selecting either a row or a column summed analog receive signal, a plurality of programmable gain amplifiers 104 for amplifying the selected analog receive signals, a plurality of analog-to-digital converters (A/DCs) 106 for converting the amplified analog receive signals into digital receive signals, a plurality of shift registers 108 for storing the individual digital receive signals, a first-in/first-out memory (FIFO) 110 for storing all of the digital receive signals prior to transmission to the CPU board 52, and timing and control circuitry 112 for controlling the function of the plurality of multiplexers 102, the plurality of programmable gain amplifiers 104, the plurality of ADCs 106, and the plurality of shift registers 108. The FIFO 110 and the timing and control circuitry 112 are under the control of the CPU board 52 so as to insure that the plurality of analog receive signals are summed according to the row or the column where the analog receive signals originated, and are then digitized so that they may be processed by the CPU board 52. It should be noted that in the embodiment of the monostatic SODAR system 10 described herein there are a total of twenty-four summing networks 100 corresponding to twelve rows and twelve columns in the array of transducer elements 34. Accordingly, it should also be noted that in the embodiment of the monostatic SODAR system 10 described herein there are twelve multiplexers 102, twelve programmable gain amplifiers 104, twelve ADCs 106, and twelve shift registers 108.

Figure 11:
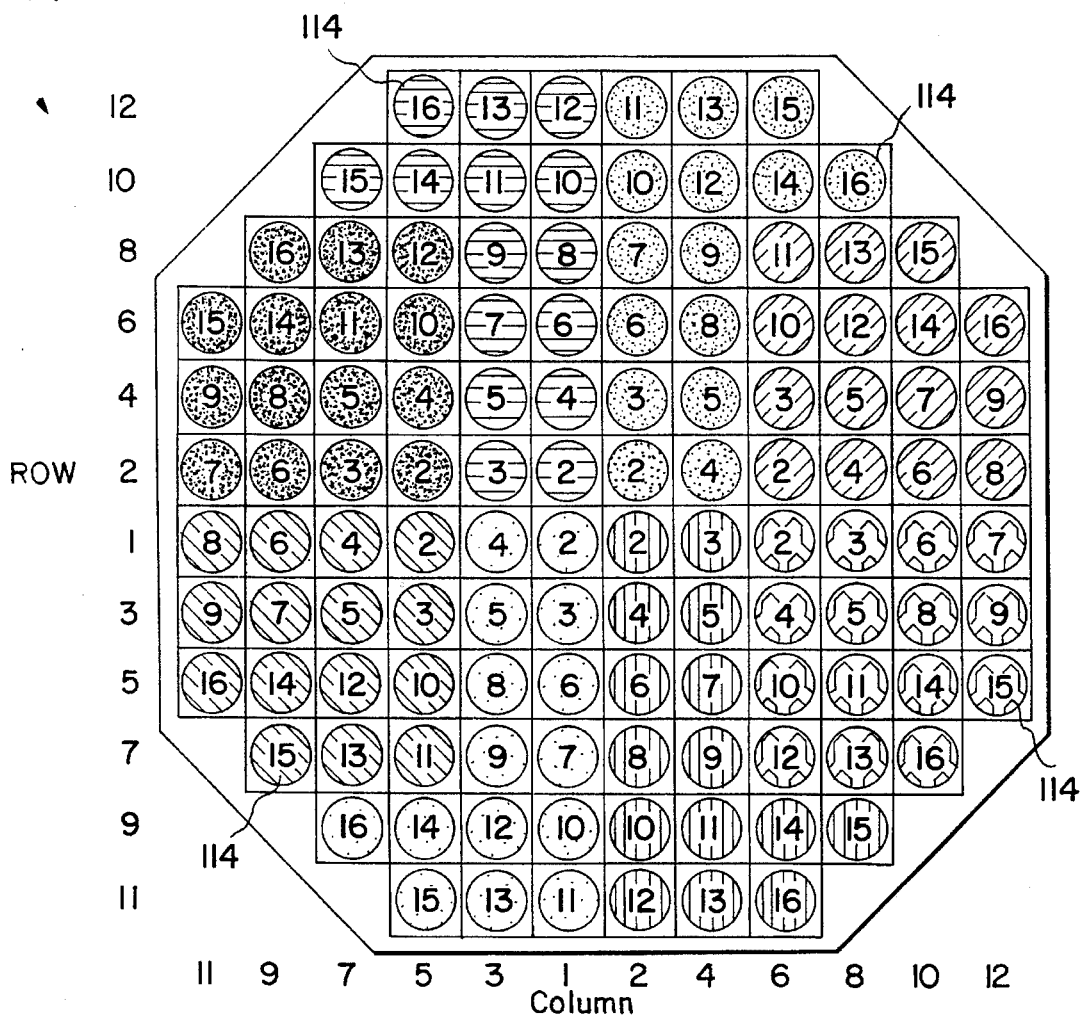
FIG. 11 is a plan view of the array of transducer elements shown in FIGS. 1 and 2.

Referring to FIG. 11, there is shown a plan view of the array of transducer elements 34. The array 34 is shown comprising 120 transducer elements 114 which are arranged in twelve rows and twelve columns. The transducer elements 114 are also arranged according to amplifier board 58 whereby the transducer elements 114 are grouped into eight groups of fifteen transducer elements 114 corresponding to the eight amplifier boards 58. Thus, each transducer element 114 in the same group is driven by one of the sixteen identical circuits on the same amplifier board 58.

Referring to FIG. 12, there is shown a table listing the connection arrangement between each transducer element 114 shown in FIG. 11 and the corresponding channel on the corresponding amplifier board 58. The transducer elements 114 are listed according to which column and which row identifies their location in the array 34 shown in FIG. 11. It should be noted that the first channel on each amplifier board 58 is classified as a spare channel, as shown in the table.

Figure 13:
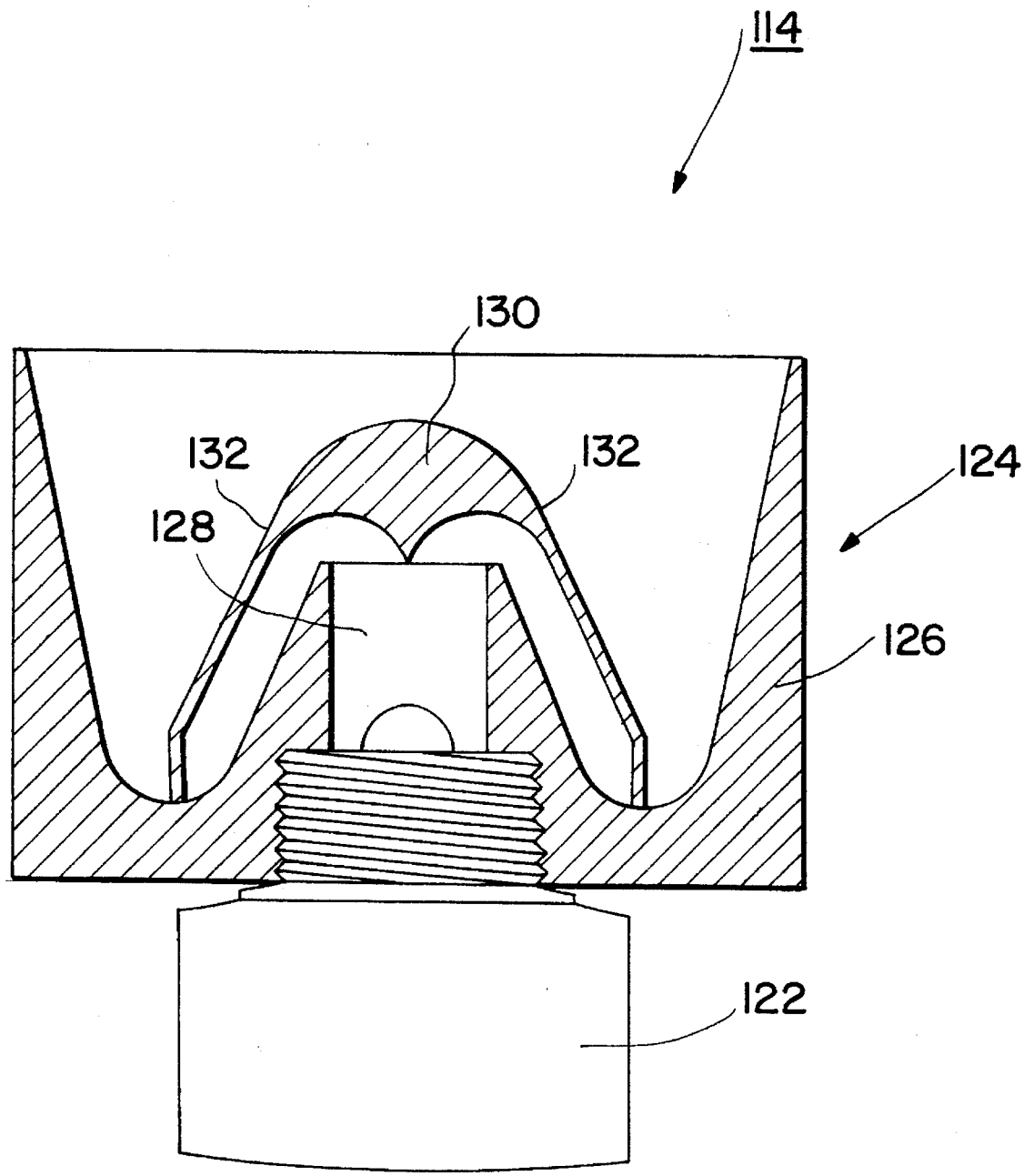
FIG. 13 is a side cross-sectional view of a typical transducer element.

Referring to FIG. 13, there is shown a side cross-sectional view of a typical transducer element 114. This particular type of transducer element 114 utilizes a folded, or reentrant, horn design. The transducer element 114 comprises a compression driver 122 and a folded horn element 124 which are attached via a threaded counterpart arrangement. The folded horn element 124 comprises a horn body 126, having a center sound channel 128 for providing access to the compression driver 122, and a channel cover 130. The channel cover 130 performs two functions. First, it prevents precipitation and other contaminants from entering the center sound channel 128, and hence the compression driver 122. Second, it reflects sound waves from the compression driver 122 down onto the horn body 126 and then out into the atmosphere. It should be noted that the channel cover 130 is supported on the horn body 126 with a plurality of cover legs 132. It should also be noted that precipitation and other contaminants that collect in the horn body 126 are drained through small drain holes (not shown) located at the bottom of the horn body 126.

Figure 14:
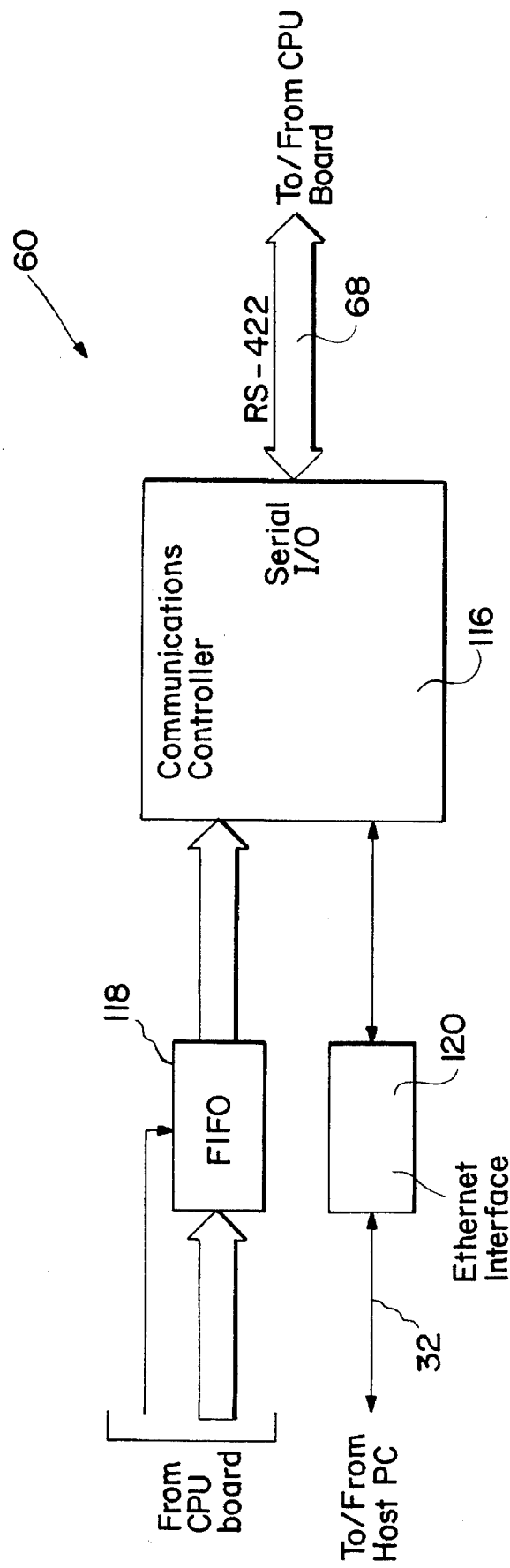
FIG. 14 is a schematic representation of the optional COM board shown in FIGS. 5 and 6.

Referring to FIG. 14, there is shown a schematic representation of the optional COM board 60. The optional COM board 56 comprises a communications controller 116 for controlling the optional ethernet communication link 32 and the optional RS-422 communication link 68, a first-in/first-out memory (FIFO) 118 for storing the digital receive signals prior to transmission to the array control instruments 18, and an ethernet communication link interface 120 for encoding and decoding ethernet communications. The optional RS-422 communication link 68 is created between the optional COM board 60 and the CPU board 52. This optional RS-422 communication link 68 allows the optional COM board 60 to receive commands from the array control instruments 18 via the optional ethernet communication link 32 whereby these commands are then transmitted from the optional COM board 60 to the CPU board 52 via the optional RS-422 communication link 68. The reason for providing this optional RS-422 communication link 68 is to reduce any impact on the operating software of the CPU board 52.

As previously mentioned, a typical transmit frequency of the monostatic SODAR system 10 described herein is 2125 Hz. The system 10 scans for reflected atmospheric signal received over a frequency range of approximately 100 Hz on either side of this transmit frequency. This transmit frequency is chosen as a compromise between a higher frequency (which would cause more rapid signal attenuation with height), and a lower frequency (which would make the system more susceptible to interference from broad-band background noise sources in the vicinity of the site).

At this point it should be noted that in the embodiment of the monostatic SODAR system 10 described herein, three separate software modules are utilized in the host PC of the array control instruments 18, each of which is controlled by the operator. The first of these software modules, the Take Data Module, is the basic operating program and is loaded automatically when the host PC is turned on. It is the operator interface with this module that controls how the system is configured to take data (e.g., pulse length, vertical sampling interval, time averaging period, etc.), start and stop of actual data acquisition, how the data are displayed to the monitor, how the data are archived to hard disk files, and whether data reports are sent to the printer.

The second of the three software modules, the Playback Data Module, is accessed by the operator by exiting the Take Data Module and then activating the Playback Data Module. The Playback Data Module enables the operator to review binary data files which may have been previously archived to hard disk files. Monitor viewing and/or hard copy print of reports from archived files are options provided the operator using the Playback Module.

The third of the three software modules, Self-Test Antenna Module, is similarly accessed by exiting the Take Data Module and then activating the Self-Test Antenna Module. When activated by the operator, the Self-Test Antenna Module executes a transmit/receive sequence that produces a report to the monitor on the operating status of each of the array's 120 transmit/receive acoustic transducers.

The three separate software modules are utilized in the host PC of the array control instruments 18 enable the operator to perform several specific functions in the operation of the monostatic SODAR system 10 described herein. A first of these functions, signal acquisition, enables the monostatic SODAR system 10 to emit a single frequency tone burst from $\frac{1}{42}$ (25 milliseconds) to $\frac{1}{2}$ of a second (500 milliseconds) long. The pulse length may be modified within this range through a Pulse Length option in the software. Long pulses put more acoustic energy into the atmosphere, providing more range coverage, but less resolution; short pulses give finer resolution, but cover less altitude. The monostatic SODAR system 10 described herein may be configured to operate at any one of a number of specific frequencies. The previously mentioned transmit frequency of 2125 Hz is based on a trade-off between minimizing absorption loss in the atmosphere and minimizing broadband background noise interference. A higher frequency provides finer spatial resolution, but less altitude coverage. Lower frequencies propagate through the atmosphere better, but are more susceptible to background noise interference.

A second function which may be performed by an operator of the monostatic SODAR system 10 described herein, signal transmission, allows a transmit pulse to be created by applying an amplified transmit waveform to the phased array antenna's 120 transducers. The transmit waveform is digitally generated by embedded firmware in the array electronics 14. As previously described, the array electronics 14 are used to produce the transmit pulse, while they are also used to receive the returning echoes.

A third function which may be performed by an operator of the monostatic SODAR system 10 described herein, signal processing, insures that once the return signal is acquired, two types of calculations are made. The first calculation detects the turbulence of layers by the magnitude of the return signal, while the second calculation uses the signal frequency (Doppler shift) to measure wind.

The magnitude of the return signal as a function of time tells the strength of turbulence as a function of altitude in the atmosphere. For this process, an outline of the current signal amplitude is needed (rather than the detail of oscillations that make up the signal.) so that the return signal is transformed into an equivalent representation which is better suited to the calculations.

Transformations for this are based on well-understood principles of digital signal processing. In particular, the return signal is converted to the analytic signal representation which has the concept of a signal envelope built into it. This conversion uses the Hilbert Transform, which is efficiently implemented with a finite impulse response (FIR) filter.

When performing the specific functions of the monostatic SODAR system 10, the three separate software modules also perform special functions during the processing of the return signal. A first of these special functions deals with the display of backscatter. The intensity of the backscatter is displayed by following five steps: 1.) sampling echo data; 2.) computing an envelope; 3.) subtracting a background noise estimate; 4.) correcting for and inverse square spreading loss; and 5.) averaging over space and time.

The return echo strength is normalized as a function of altitude to enhance the contract of atmospheric features on the backscatter display. According to the "SODAR equation", the received echo strength is a combination of the turbulence intensity and propagation loss factors, such as absorption, inverse square spreading loss, and array gains. The monostatic SODAR system 10 described herein applies a range power correction to the backscatter curve. This correction factor is 1.5 unless the operator wishes to change it either upward in order to further emphasize upper-altitude signal strength, or downward in order to de-emphasize upper-altitude signal strength.

A second special function deals with estimating winds. The monostatic SODAR system 10 described herein measures the Doppler shift of the transmitted sound wave. The frequency of the reflected signal is used to detect the radial movement of air. If air is moving away from the antenna array 12, the frequency of the reflected signal is slightly lower than the frequency of the transmitted signal. If air is moving toward the antenna array 12, the reflected signal is slightly higher. At most locations, with no special terrain effects, the average vertical wind speed is zero, but even then the air moves up and down. The amount of this movement can predict how pollutants disperse in the atmosphere. The monostatic SODAR system 10 described herein calculates the standard deviation of the vertical wind velocity in air pollution models.

Horizontal winds may also be computed with the monostatic SODAR system 10 described herein. By combining the radial wind velocities from a vertical beam and a beam tilted 15 degrees off-vertical, the horizontal wind vector can be computed in the plane of the two beams. If a third beam is added, also tilted 15 degrees but at an azimuth orthogonal to the plane of the other two, the remaining wind component can be measured and the total wind vector can be determined (horizontal wind speed and direction, and vertical wind speed.)

For three-dimensional wind measurements, each of the three beam paths is pulsed in turn to form a cycle. A complete wind profile is computed from the frequency shifts in the three beams. (Averaging winds over ten to fifteen minute periods is common.) The resulting wind profile includes horizontal wind speed and direction and the vertical wind standard deviation for the discreet altitudes for which the system can get sufficient backscatter. A third special function deals with noise. Acoustic noise sources include heavy traffic, wind-generated noise, and transient noise. The latter arises from high level sources which last for a short time (i.e. birds chirping, construction beepers, trains, etc.). They appear in intensity as a solid, vertical band.

The flow noise of high wind passing over objects increases background noise. The winds also deflect the transmit and receive beams which may reduce the sensitivity of the antenna array 14.

The monostatic SODAR system 10 described herein utilizes a number of techniques for dealing with this noise. First, the return signal is averaged over a longer period of time. Second, when transient noise source is detected, those sections of data which contain it are thrown out. Third, the system equipment should be placed in a location with minimum possible background noise (broadband and transient). Finally, the antenna array 12 can be placed in a hole below ground level.

With the present invention monostatic SODAR system 10 now fully described, it can thus be seen that the primary objective set forth above is efficiently attained and, since certain changes may be made in the above-described system 10 without departing from the scope of the invention, it is intended that all matter contained in the above description or shown in the accompanying drawings shall be interpreted as illustrative and not in a limiting sense.

What is claimed is:

1. A sound detection and ranging (SODAR) system comprising:

an array of acoustic transducer elements, wherein each acoustic transducer element in said array is responsive to one of a plurality of analog transmit signals for providing a beam of transmitted acoustic energy, wherein each beam of transmitted acoustic energy provided by each acoustic transducer element in said array is combined so as to form a directed beam of transmitted acoustic energy, and wherein each acoustic transducer element in said array is responsive to a reflected portion of said directed beam of transmitted acoustic energy for providing one of a plurality of analog receive signals, said reflected portion of said directed beam of transmitted acoustic energy being reflected by wind in the atmosphere;

analog signal generating means responsive to digital-to-analog control signals for generating said plurality of analog transmit signals;

analog-to-digital conversion means responsive to analog-to-digital control signals for converting said plurality of analog receive signals into a plurality of digital receive signals; and control and processing means for generating said digital-to-analog control signals and said analog-to-digital control signals so as to control said analog signal generating means and said analog-to-digital conversion means, respectively, said control and processing means being responsive to said plurality of digital receive signals for providing an indication of wind characteristics based on the characteristics of said reflected portion of said directed beam of transmitted acoustic energy as compared to the characteristics of said directed beam of transmitted acoustic energy.

2. The SODAR system as defined in claim 1, further comprising amplifying means for amplifying said plurality of analog transmit signals and amplifying said plurality of analog receive signals.

3. The SODAR system as defined in claim 2, wherein said directed beam of transmitted acoustic energy is steered independent of frequency due to a time delay design.

4. The SODAR system as defined in claim 2, wherein the frequency of each beam of transmitted acoustic energy is identical.

5. The SODAR system as defined in claim 2, wherein the frequency of said directed beam of transmitted acoustic energy is variable by said control and processing means.

6. The SODAR system as defined in claim 2, wherein the frequency of said directed beam of transmitted acoustic energy is limited only by the dimensions of said array of acoustic transducer elements.

7. The SODAR system as defined in claim 2, wherein the direction of said directed beam of transmitted acoustic energy is variable by said control and processing means.

8. The SODAR system as defined in claim 2, wherein said analog-to-digital conversion means allows for simultaneously converting said plurality of analog receive signals into said plurality of digital receive signals.

9. The SODAR system as defined in claim 2, wherein said analog signal generating means allows for simultaneously generating said plurality of analog transmit signals.

10. The SODAR system as defined in claim 2, wherein said plurality of analog transmit signals are shifted in time by said analog signal generating means.

11. The SODAR system as defined in claim 2, wherein said array of acoustic transducer elements comprises an array of 120 acoustic transducer elements.

12. The SODAR system as defined in claim 2, wherein the frequencies of said plurality of analog transmit signals are identical.

13. The SODAR system as defined in claim 2, further comprising transmission means for transmitting said indication of wind characteristics to a remote location.

14. The SODAR system as defined in claim 13, wherein said transmission means comprises an RS-422 communication link.

15. The SODAR system as defined in claim 13, wherein said transmission means comprises an ethernet communication link.

16. The SODAR system as defined in claim 2, wherein said control and processing means comprises a digital central processing unit.

17. The SODAR system as defined in claim 2, wherein said analog signal generating means comprises a digital-to-analog converter.

18. The SODAR system as defined in claim 2, wherein said analog-to-digital conversion means comprises an analog-to-digital converter.

19. A method for determining atmospheric wind conditions utilizing a sound detection and ranging (SODAR) system, comprising:

(a) providing an array of acoustic transducer elements, wherein each acoustic transducer element in said array is responsive to one of a plurality of analog transmit signals for providing a beam of transmitted acoustic energy, wherein each beam of transmitted acoustic energy provided by each acoustic transducer element in said array is combined so as to form at least a first directed beam of transmitted acoustic energy, and wherein each acoustic transducer element in said array is responsive to a reflected portion of said directed beam of transmitted acoustic energy for providing one of a plurality of analog receive signals, said reflected portion of said directed beam of transmitted acoustic energy being reflected by wind in the atmosphere;

(b) generating said plurality of analog transmit signals by providing digital control signals to a digital-to-analog converter;

(c) converting said plurality of analog receive signals into a plurality of digital receive signals;

(d) processing said plurality of digital receive signals to provide an indication of the radial wind velocity along said directed beam based on the characteristics of said reflected portion of said directed beam of transmitted acoustic energy as compared to the characteristics of said directed beam of transmitted acoustic energy; and (e) repeating steps (b) through (d) for at least a second directed beam having a differing spatial orientation from said first directed beam; and combining the radial wind velocities to determine the wind vector in the plane of the first and second directed beams.

20. A method in accordance with claim 19, wherein said first beam is vertically oriented and said second beam is tilted off-vertical, whereby the horizontal wind vector is determined in the plane of the two beams.

21. A method in accordance with claim 20, including repeating steps (b) through (d) for a third directed beam tilted off-vertical at an azimuth orthogonal to the plane of the first and second directed beams, whereby the total wind vector can be determined.

* * * * *